United States Patent [19]
Kai et al.

[11] Patent Number: 6,128,035
[45] Date of Patent: Oct. 3, 2000

[54] ANTI-BLUR IMAGE PICKUP DEVICE

[75] Inventors: Tadao Kai, Kawasaki; Akira Katayama, Koganei; Sueyuki Ohishi, Tokyo, all of Japan

[73] Assignee: Nikon Corporation, Tokyo, Japan

[21] Appl. No.: 08/805,041

[22] Filed: Feb. 21, 1997

Related U.S. Application Data

[63] Continuation of application No. 08/377,832, Jan. 25, 1995, abandoned.

[30] Foreign Application Priority Data

Apr. 28, 1994 [JP] Japan ..................................... 6-092653

[51] Int. Cl.$^7$ .......................... H04N 5/228; H04N 5/217; H04N 7/12
[52] U.S. Cl. ........................... 348/208; 348/241; 348/430
[58] Field of Search ..................................... 348/208, 241, 348/430, 75; H04N 5/228, 5/217, 7/12, 7/13

[56] References Cited

U.S. PATENT DOCUMENTS 5,192,964   3/1993   Shinohara .............................. 354/402
5,606,456   2/1997   Nagata et al. .

FOREIGN PATENT DOCUMENTS

62-47012   2/1987   Japan .

Primary Examiner—Nathan Flynn
Assistant Examiner—Vivek Srivastava

[57] ABSTRACT

A blur-correcting image pickup device includes, but is not limited to an image pickup optical system for picking up an image, a vibration-detecting device which detects vibrations of the image pickup device and generates an output relative to the detected vibrations, a blur-correcting device which corrects blurring of the image caused by the vibrations, a rangefinder which detects distance of the image to be picked up and generates an output relative to the detected image pickup distance, and an optical system setup device which sets up a specific image pickup condition for the image pickup optical system. The blur-correcting image pickup device further includes an arithmetic information generating device which generates a first arithmetic factor when the specific image pickup condition is set up and a second arithmetic factor corresponding to the output of the rangefinder when the specific image pickup condition is not set up by the optical system setup device and a drive control device which calculates corrective information based on the output of the vibration-detecting device and the output of the arithmetic information generating device to control the blur-correcting device based on the corrective information.

18 Claims, 8 Drawing Sheets

ANTI-BLUR IMAGE PICKUP DEVICE

This application is a continuation of application Ser. No. 08/377,832, filed Jan. 25, 1995, now abandoned.

BACKGROUND OF THE INVENTION

1. Field of the Invention

The present invention relates to an imaging device such as a camera that is capable of correcting the effects of blurring in picked-up images which are due to vibrations applied to the device.

2. Description of the Related Art

A typical blur-correcting image pickup device is disclosed in Japanese laid open patent application no. 62-47012. The device depicted in the '012 application detects the vibration of the image pickup device, calculates a vibration quantity from the detection result, and performs correction control corresponding to the vibration quantity. The '012 application states that in order to calculate the vibration quantity, it is necessary to know the displacement of the optical axis, and to do so, such factors as blurring due to rotations around a principal point, blurring due to parallel transfer of the principal point, focal distance of the lens, lateral magnifying power, rotary angle of the optical axis, and parallel transfer distance of the principal point are required as well.

The aforementioned '012 application also mentions a focus position detection device and an auto-focus (AF) focusing device which incorporate through the lens (TTL) focus detection device methods. In such TTL focus detection methods, the focus position detection device generates an output of the lateral magnifying power ($\beta$) to the control circuit. It detects the positioning motion of the focusing optical system controlled by the focusing drive of the AF focusing device, and uses it to calculate the blurring quantity to be corrected. In other words, in order to calculate the blurring quantity, such prior art devices require a detection device to monitor the lens focus position continuously, to output a data signal of the lateral magnifying power, and to conduct the blur quantity calculation continuously based on the output.

As such, the prior art devices mentioned above incorporate the following problems. First, it is troublesome to continuously monitor the motion of the focusing optical system as it demands a large information processing capability for a control circuit, It is not easy to provide a high performance CPU in a camera, especially in regard to the costs associated with including a high performance CPU in a mass-produced camera product.

Second, the lens-shutter camera (hereinafter "LS camera"), which is becoming increasingly popular, measures object distance by the triangulation method using external light by resorting to a complicated procedure, that involves distance measuring operations, calculation operations, focusing drive operations and detection of the focusing motion.

Third, the positioning motion of the LS camera is often designed as a stepping motion, so that it is not quite necessary to detect the motion continuously, but rather it is sufficient to store simply the stepping position in the memory.

In case of the LS camera equipped with a so-called "infinite distance shooting mode" feature (a popular feature of the typical LS camera), which is useful in case the AF focusing device may not work (e.g., in picture taking situations across a window), selecting the infinite distance shooting mode automatically specifies the position of the focusing system so that storing the specified step position in memory suffices the above-mentioned purpose.

Also, in case of a camera equipped with "close-up" and "portrait" modes, it is sufficient to keep those specific step positions in the memory and to not continuously monitor optical axis shifts caused by camera vibration.

SUMMARY OF THE INVENTION

Accordingly, it is therefore an object of the present invention to solve the aforementioned and other problems of prior art cameras and the like.

It is another object of the present invention to provide anti-blurring operations via use of pre-set and pre-stored operational parameters and the like for an optical imaging system.

It is still another object of the present invention to provide anti-blurring operations in the context of a camera based on operational mode parameters of that camera instead of continuously monitoring focus states or the like.

Objects and advantages of the present invention are achieved by providing a blur-correcting image pickup device that includes, but is not limited to an image pickup optical system for picking up an image, a vibration-detecting device which detects vibrations of the image pickup device and generates an output relative to the detected vibrations, a blur-correcting device which corrects blurring of the image caused by the vibrations, a rangefinder which detects object distance and generates an output relative to the detected object distance, an optical system setup device which sets up a specific image pickup condition for the image pickup optical system, an arithmetic information generating device which generates a first arithmetic factor when the specific image pickup condition is set up and a second arithmetic factor corresponding to the output of said rangefinder when the specific image pickup condition is not set up by the optical system setup device and a drive control device which calculates corrective information based on the output of the vibration-detecting device and the output of the arithmetic information generating device to control the blur-correcting device based on the correction information.

Other objects and advantages of the present invention are achieved by providing a camera that includes, but is not limited to, a system to produce an image of a subject, a vibration detection device detecting vibrations of the camera and generating vibration information, a blur correction device correcting blurring of the image caused by the vibrations, a rangefinder detecting subject distance and generating distance information, an optical system setting device for setting an optical condition for the optical system, a parameter setting device generating a first parameter when the optical condition is set by said optical system setting device and a second parameter corresponding to the output of the rangefinder when the optical condition is not set by the optical system setting device and a drive control device calculating corrective information based on the output of the vibration-detecting device and the output of the parameter setting device to control the blur-correcting device based on the correction information.

BRIEF DESCRIPTION OF THE DRAWINGS

The aforementioned and other objects of the present invention will become apparent and readily appreciated from the following description of the preferred embodiments, taken in conjunction with the accompanying drawing figures, of which.

DETAILED DESCRIPTION OF THE PREFERRED EMBODIMENTS

The following description is provided in reference to the drawing figures which were briefly described above. Like parts are referred to by like reference numerals.

It is to be understood that while a film-based camera is used as the preferred and exemplary embodiment described herein according to the invention, the present invention is no so limited. In fact, the present invention, as disclosed herein and defined in the appended claims, is applicable to other imaging devices such as video motion and video still camera arrangements. By the term "camera," it is to be expressly understood that the present invention is directed to any device that is capable of capturing still or moving images and storing or recording those images on some form of media (e.g., a film surface, a digital recording medium, etc.).

Figure 1:
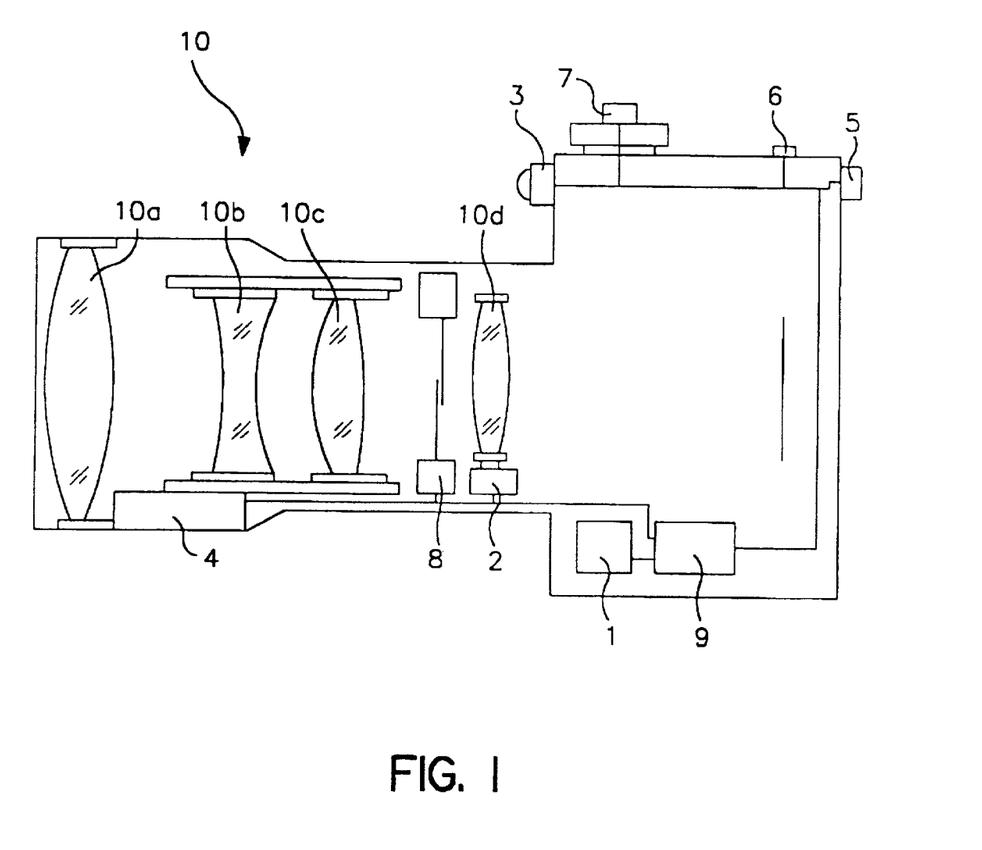
FIG. 1 is a diagram that depicts a first embodiment of the present invention.
Figure 2:
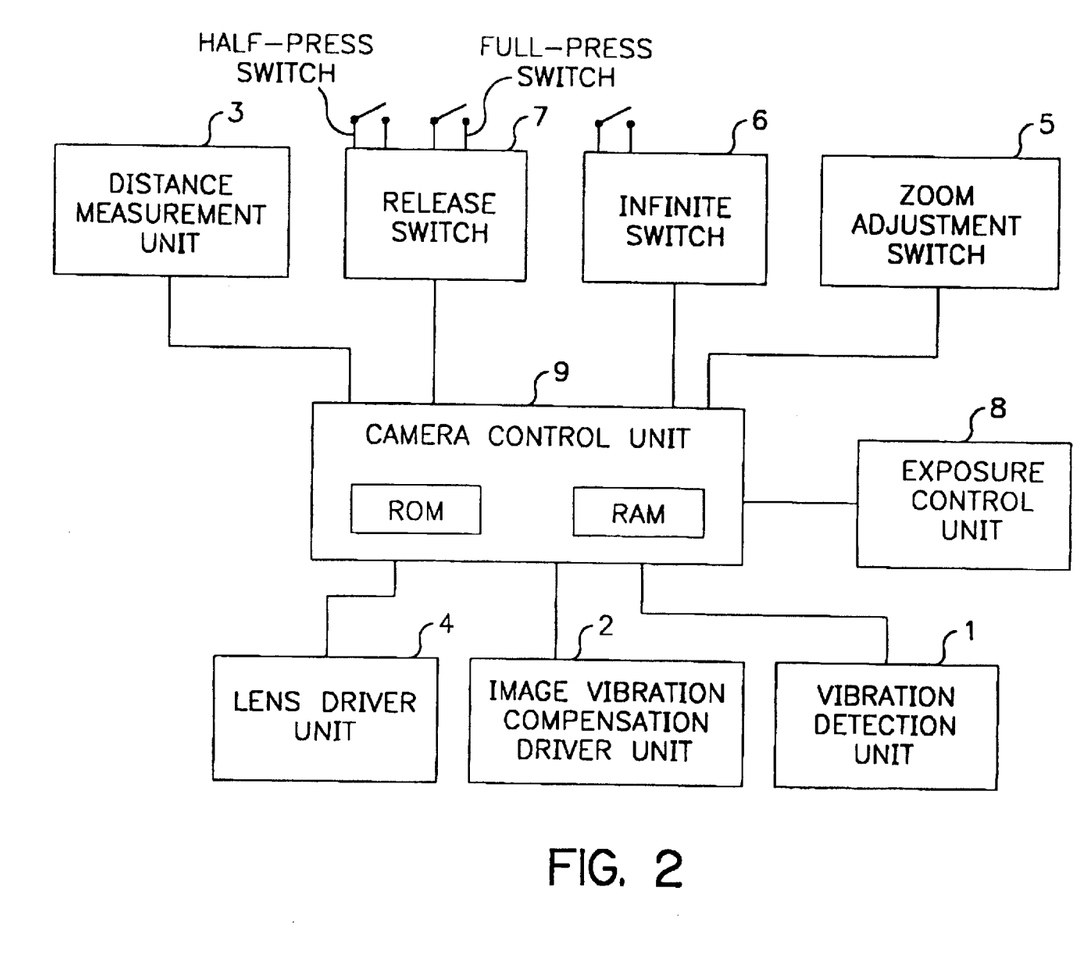
FIG. 2 is a block diagram of the embodiment depicted in FIG. 1.

Referring now to FIGS. 1 and 2, therein depicted are diagrams, including a block diagram, of a first embodiment of the present invention. In particular, a blur-detection or vibration detection unit 1 detects the vibrations that are applied to a camera. Blur-detection unit 1 includes a commonly available angular velocity sensor. A vibration type gyroscope is most suitable for such an angular velocity sensor.

A blur-correction drive unit or image vibration compensation drive unit 2 drives blur-correcting optical system 10d in a manner described below. While various drive mechanisms are known, the most suitable drive mechanisms for a camera includes a type wherein motor-driven feed screw moves blur-correcting optical system 10d, and a type where a linear motion of a coil, which is normally known as a voice coil, is driven by electro-magnetic force.

A distance measurement unit, which preferably comprises a rangefinder unit 3 detects distance of an object or subject to be photographed and generates an output corresponding to the detected value. One of the most common rangefinders is a triangulation type wherein the object is illuminated by infra-red light (IRED), the reflecting light is caught by an PSD, and the distance is measured by the condition of the light being received.

Lens drive unit 4 adjusts the position of an image pickup optical system 10 in the optical axis direction in order to focus according to the object distance detected by the rangefinder unit. The present embodiment is configured in such a way that it adjusts the position in steps (in discrete units) due to the use of stepper motor motions. In addition, the zoom condition of image pickup optical system 10 is similarly adjusted, when a zoom adjustment switch 5 is activated. Such stepper arrangements will be apparent to those skilled in the art.

When the operator operates the zoom adjustment switch 5, the zoom condition of image pickup optical system 10 is adjusted through the adjustment of lens drive unit 4. It could be a momentary switch (the kind which is restored to the original position by spring action) of two positions, i.e., telephoto and wide-angle, or it could be a continuously adjusting dial type input device, Such switching devices will be apparent to those skilled in the art.

An infinite switch 6 is provided and is used to set up an "infinite distance shooting mode" that enforces a condition for image pickup optical system 10 to focus on infinitely distant objects or subjects.

A release switch 7 includes a half-press switch 7a and a full-press switch 7b. When the half press switch 7a is operated and in the "ON" condition, camera control unit 9 starts a series of actions of the camera. Camera control unit 9 starts the exposure action when camera control unit 9 detects the "ON" condition of the full-press switch 7b.

Exposure control unit 8 is a unit to regulate the exposure illumination intensity and the exposure time for the camera of the present embodiment, The camera uses a lens shutter. Of course, it can be combined with other types of diaphragm units, or it can be a combination of a focal plane shutter and a diaphragm.

The camera control unit 9 is connected to the various components of the camera described above to detect, store, and judge the status of blur-detection unit 1 and rangefinder unit 3, as well as to control, start and stop the drives of blur-correction drive unit 2, lens drive unit 4, and exposure control unit 8. It will be readily appreciated that camera control unit includes a RAM and a ROM which are utilized in a conventional manner.

The image pickup system 10 generally comprises a plurality of optical lenses. Although the details of the lens type is not going to be discussed here, it can, for example, be a zoom lens as exemplary disclosed by U.S. Pat. No. 4,978, 205 which Is owned by the present assignee and which is incorporated herein by reference. The structures disclosed in the '205 patent do not have to be, of course, limited to the types described therein, and can be any type of zoom lens, or a single focus lens as well.

As embodied herein, image pick-up system Includes lens groups 10a, 10b, 10c, and 10d. The first group of lenses (convex lens group) 10a can be moved back and forth along the optical axis for focus adjustment. A second group of lenses (concave lens group) 10b can be moved back and forth along the optical axis for zoom adjustment in combination with a third group 10c of lenses (convex lens group). The third group of lens (convex lens group) 10c can be moved along the optical axis in coordination with the motion of the second lens group 10b. A fourth group of lenses (convex lens group) 10d can be moved perpendicular to the optical axis and functions as the blur-correction or image vibration compensation optical system.

Other kinds of blur-correction systems can be used in place of the one explained above, for example, a kind wherein the image pickup optical system of a known type is shifted or is first shifted and then tilted, or a kind wherein the light flux is deflected using a variable apex angle prism. Moreover, blur-correction optical system 10d can be of a type that moves parallel to the optical axis direction. The types of blur-correction optical systems just mentioned are meant to be applicable for embodiments of the present Invention.

Figure 3:
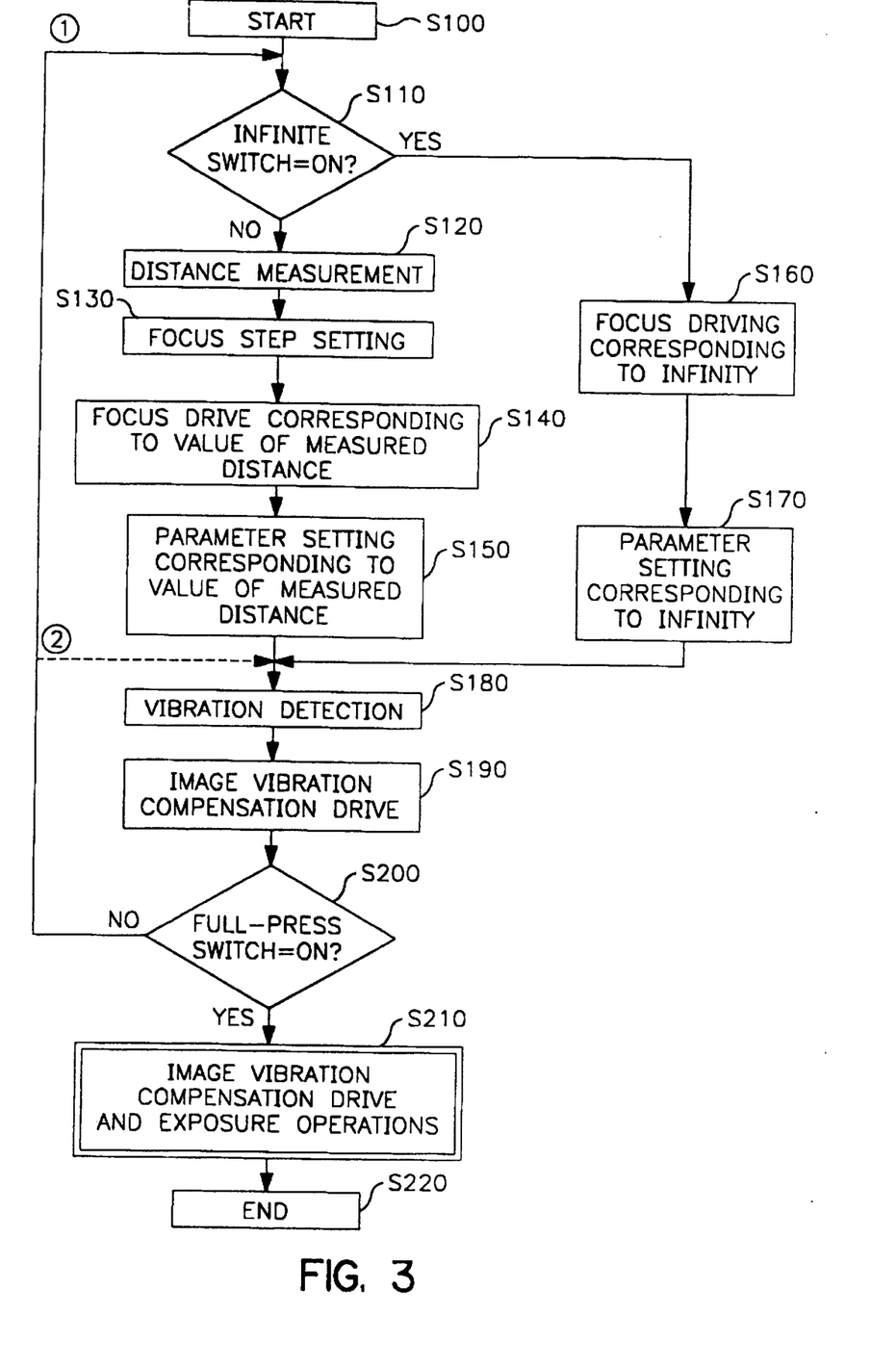
FIG. 3 is a flow chart that illustrates the operation of the embodiment depicted in FIG. 1.

Referring now to FIG. 3, therein depicted is a flow chart that illustrates the operations of the first embodiment described above.

If camera control unit 9 detects that release half-press switch 7a is "ON" then the following operations will take place starting from step S100. Also, the following discussion of the operations depicted in FIG. 3 are presented serially by referencing each step in the flow chart. The term "step" is abbreviated as "S."

S110: First, if camera control unit 9 detects the status of infinite distance switch 7 to be "ON", then the photographer has set the infinite distance photography mode and processing proceeds to S160. If the switch Is "OFF", processing proceeds to S120.

S120: Distance information is detected by distance measurement unit 3 and is input to camera control unit 9.

S130: Based on the above-gathered distance information, camera control unit 9 calculates the adjustment in focus step position towards the optical axis of photographic optical system 10.

S140: Camera control unit 9 performs driver control for the lens drive unit 4. The position of photographic optical system 10 is adjusted to the focus step position computed in S130.

S150: Based on the photographic distance information obtained in S120, parameters for image vibration compensation drivers are set in control unit 9. These parameters are based on the focus step position corresponding to gathered photographic distance information. These parameters are previously stored in the memory of camera control unit 9. The use of these parameters will be explained later. After the parameters have been set, processing proceeds to S180.

S160: Since the photographer has already selected the "infinite distance photographic mode", it is desirable to set the focus step position for adjusting the optical axis direction of photographic optical system 10 to the optimum position for infinite photographic distance. Camera control unit 9 performs driver control of lens drive unit 4, and adjusts the position of photographic optical system 10 towards the focus step position of the above-described "infinite distance photographic mode". This position is already stored in the memory of camera control unit 9, S170: Camera control unit 9 sets the parameters for the image vibration compensation drive unit used during set up of the "infinite distance photographic mode". These values have also been stored in the memory of camera control unit 9. The use of these parameters will be explained later as well. After set up, processing proceeds to S180.

S180: Camera vibration information detected by vibration detection unit 1 is input to camera control unit 9. Since the vibration sensor used in the vibration detection unit has generally low detection accuracy when the operation begins, detection operation preferably should be started when the operation flow begins at S100.

S190: Using the vibration information obtained in S180, parameters set in S150 or S170, and lens zoom position information, etc. the camera control unit 9 computes the amount of image vibration caused by camera vibration, and then outputs a driver control signal to image vibration compensation drive unit 2 in order to compensate for the image vibration. The image vibration compensation optical system or lens group 10d is driven to compensate for image vibration.

S200: Camera control unit 9 determines whether release full-press switch 7b is "ON" or not. If "ON", the exposure operations begin at S210. If not "ON", then it is not the exposure timing and S110 is returned to, as indicated by solid line ① in the diagram. For compatibility of this example to a "one shot mode" focusing operations are performed only once after pressing the release half-press switch. Once focused, if the release half-press switch is not press again, focusing operations will not be performed again and S180 may be returned to after S210, as indicated by dotted line ② in the diagram.

Only a summary of exposure operations from S210 onward are explained below. Details have been omitted as the same will be readily apparent to those skilled in the art.

While image vibration compensation driving is being performed in S210, exposure operations are being performed. Simultaneously with the repetition of S180 to S190 as explained above, camera control unit 9 performs driver control of exposure control unit 8. The exposure is suitable for the film (the imaging medium of the photographic equipment.)

When the suitable exposure operation is finished, S220 is advanced to and consecutive operations are complete.

At this time, the specified driver position of image vibration drive unit 2 is reset by camera control unit 9, and this drive operation is complete.

The operation of vibration detection unit 1 is either complete, or completed after the elapse of time corresponding to an increase in the timer which is located in camera control unit 9 or elsewhere. This does not have to be simultaneous with operation of the image vibration compensation drive unit 2, and may be done afterwards. Since detection accuracy is poor when the operation begins, continuous operation may be a good idea for consecutive photography.

Next, parameter setting in S150 and S170 will be explained with further reference to FIG. 4.

Figure 4:
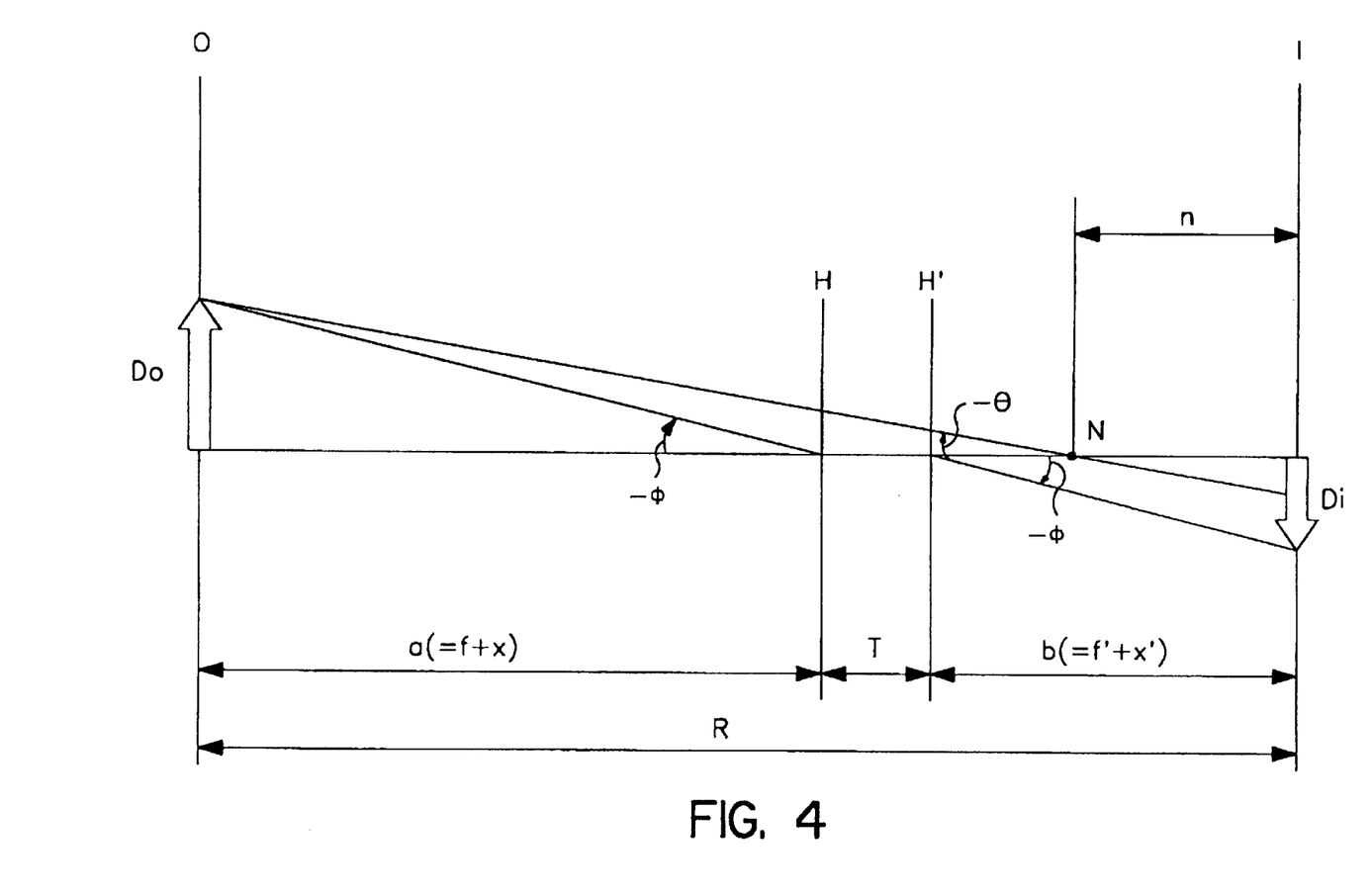
FIG. 4 is a graph that illustrates the relationships between variations in the optical axis and image blur effects addressed by the present invention.

Referring now to FIG. 4, therein depicted is a graph that illustrates the relationships between variations in the optical axis and image blur effects addressed by the preferred embodiment of the present invention. In particular, the distance between the object or subject to be photographed and the main front horizontal surface (H) of the photographic optical system is denoted as "a".

The distance between the image surface and the main back horizontal surface (H') of the photographic optical system is denoted as "b".

The image surface is a specific position on the film surface.

The distance between the main front horizontal surface (H) and the main back horizontal surface (H') of the photographic optical system is denoted as "T". In other words, T indicates an optical lens thickness when it is used as a lens for the photographic optical system.

The distance between the object or subject to be imaged or photographed and the image surface is denoted as "R".

As such, $$R = a + T + b \qquad \text{Formula 1}$$

Variations in the angle of the optical axis are blurs caused by the rotation of camera equipment around one point on the optical axis. Point "N" is denoted as the center of this revolution. The distance between point "N" and the image surface is denoted as "n".

As shown in FIG. 4, for a stationary object, the camera equipment's optical axis centered on point "N" varies Do over a minute amount of time (=dt).

In other words, if the optical axis for this equipment is the standard, there was a variation (−dθ) in the equipment along the direction of the object to be photographed, centered on point "N". An equivalent amount of this movement is shown as "Do" in FIG. 4.

The variation in the angle of incidence (−dφ) from the object to be photographed towards the photographic optical system can be computed as follows.

$$-d\phi = (a+T+b-n) \times (-d\theta)/a$$
$$= -d\theta \times (R-n)/a \quad \text{Formula 2}$$

From Formula 2, the amount of blur in the formed image can be computed as follows.

$$Dim = b \times (-d\phi)$$
$$= -b \times d\theta \times (R-n)/a \quad \text{Formula 3}$$

As explained previously in regard to FIGS. 1 and 2, the vibration compensation optical system shifts in this embodiment. To compensate for the image blur quantity Dim, the compensating optical system is usually shifted by a specific amount in the reverse direction. The amount of optical axis variation is dθ, and the amount of shift in the compensating optical system drive unit is ds(dθ). And, in general, ds=Di× C.

Accordingly, $$ds(d\theta) = C \times b \times d\theta \times (R-n)/a$$
$$= G \times d\theta \quad \text{Formula 4}$$

Where:

$$G = C \times b \times (R-n)/a$$

And, where C is a constant.

Furthermore, t1 is the start time of the image blur compensation drive unit described above. Denoting the compensation optical system shift position as S (t1), after a time dt, the compensation optical system shift position is S (t1)+dt as described by the following relation.

$$S(t1+dt) = S(t1) + ds(d\theta)$$
$$= S(t1) + (G \times d\theta) \quad \text{Formula 5}$$

To determine "R", "a", "b" and "G" in Formula 4 ("n" will be explained later), it is desirable to know the position of the optical axis direction for photographic optical system 10. Based on information from distance measurement unit 3 and the signal from the zoom adjustment switch 5, camera control unit 9 controls lens drive unit 4 and determines the position of the photographic optical system. The above coefficients can easily be determined by camera control unit 9 from information already contained in camera control unit 9 concerning the position of optical system 10.

As such, the aforementioned discussions illustrate that the preferred embodiments of the present invention are well suited for cases such as when using driving equipment in lens drive unit 4, which does not require driving feedback from the stepping motor.

There is one more variable in Formula 4, that is, the value "n". Since the photographers face will press against the eyepiece unit of the camera or the camera body will be held by the photographer's hands, the rear edge of the camera will not move very much. Therefore it is easy for there to be rotation blurs centered in the vicinity of the eyepiece unit (rear edge of the camera). For a lens-shutter camera, It is best to set "n=0". However, this value can change depending upon the shape of the camera. It is a good idea to use experimentally obtained values. Normally, compared to coefficient "b", "n" is in the range of −|b|<n<|b|.

With the addition of zoom adjustment condition considerations, photographic distance Information from distance measurement unit 3 is used to determine the aforementioned coefficients.

Of course, the camera in the preferred embodiments of the invention does not have to possess an attached zoom lens, and a simple photographic focusing lens may also be used. Since it will not be necessary to consider zoom adjustment conditions, the above coefficients are determined directly by photographic distance information from distance measurement unit 3.

Also, it should be understood that "dθ" can be obtained from computations based on information from vibration detection unit 1. And, if "G", which corresponds to the optical axis position of photographic optical system 10, and other coefficients used in the above formulas are stored in the memory of camera control unit 9, coefficients can be set according to the status of photographic optical system 10, so that the image compensation drive unit 2 will perform more accurately.

The set-up position of the optical axis for photographic optical system 10 in the "infinite distance photographic mode" is generally not included in the focusing steps based on distance measurement results. Compared to "infinity", a rather close position setting Is used as the step position of an object for re-photographing at a far distance. The reason for such a situation is that for photography of a rather close object, even if there is an error in distance measurement, the photographic result will still be of a certain level and quality.

On the other hand, if the photographer chooses the "infinity" position and sets the "infinite photographic mode", photographic results are generally good.

Referring again to FIG. 3, the special "infinite" parameters of S170 are valid when "infinite photographic mode" is selected. In S170, "G" is set either as "C×b", or a very close value (for example (0.9×C×b)<x<(1.1×C×b)). The reason that it is not limited to "C×b" is because in the "infinite photographic mode", the settings of optical system 10 are based on consideration of the depth to the object to be photographed. The position does not correspond to a totally infinite object.

While taking into account the status of the photographic optical system's zoom adjustments, camera control unit 9 sets "G" in S160 based upon photographic distance information from distance measurement unit 3.

Moreover, based on formula 4, camera control unit 9 controls image vibration compensation drive unit 2 in S190. Also, as explained above, in response to the amount of blur caused by fluctuation of the optical axis camera equipment dθ, the amount of driver shift in the optical compensation system ds(dθ) was calculated.

Additionally, a formula similar to Formula 6 can be used to determine the optical vibration compensation system's shift driver velocity (=ds'(w)), where "w" is the speed at which the optical axis of the camera system inclines, or in other words, the angular velocity of the revolving blur.

As such, $$ds'(w) = C \times b \times w \times (R-n)/a$$
$$= G \times w \quad \text{Formula 6}$$

Where:

$$G = C \times b \times (R-n)/a$$

And, where C is a constant.

The value for "W" is obtained based on information from vibration detection unit 1.

Figure 5:
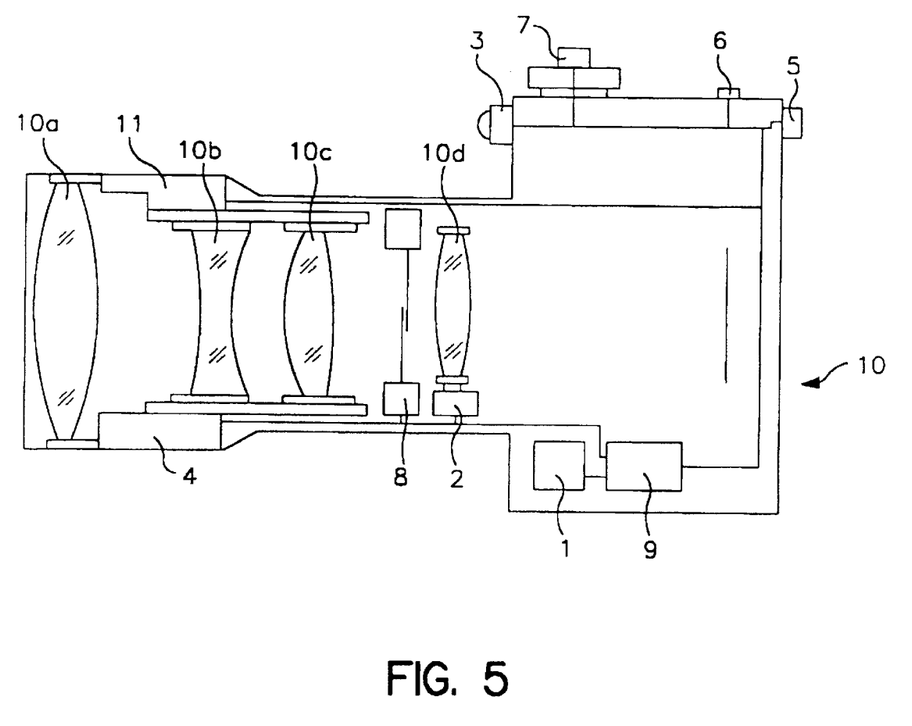
FIG. 5 is a diagram that depicts a second embodiment of the present invention.
Figure 6:
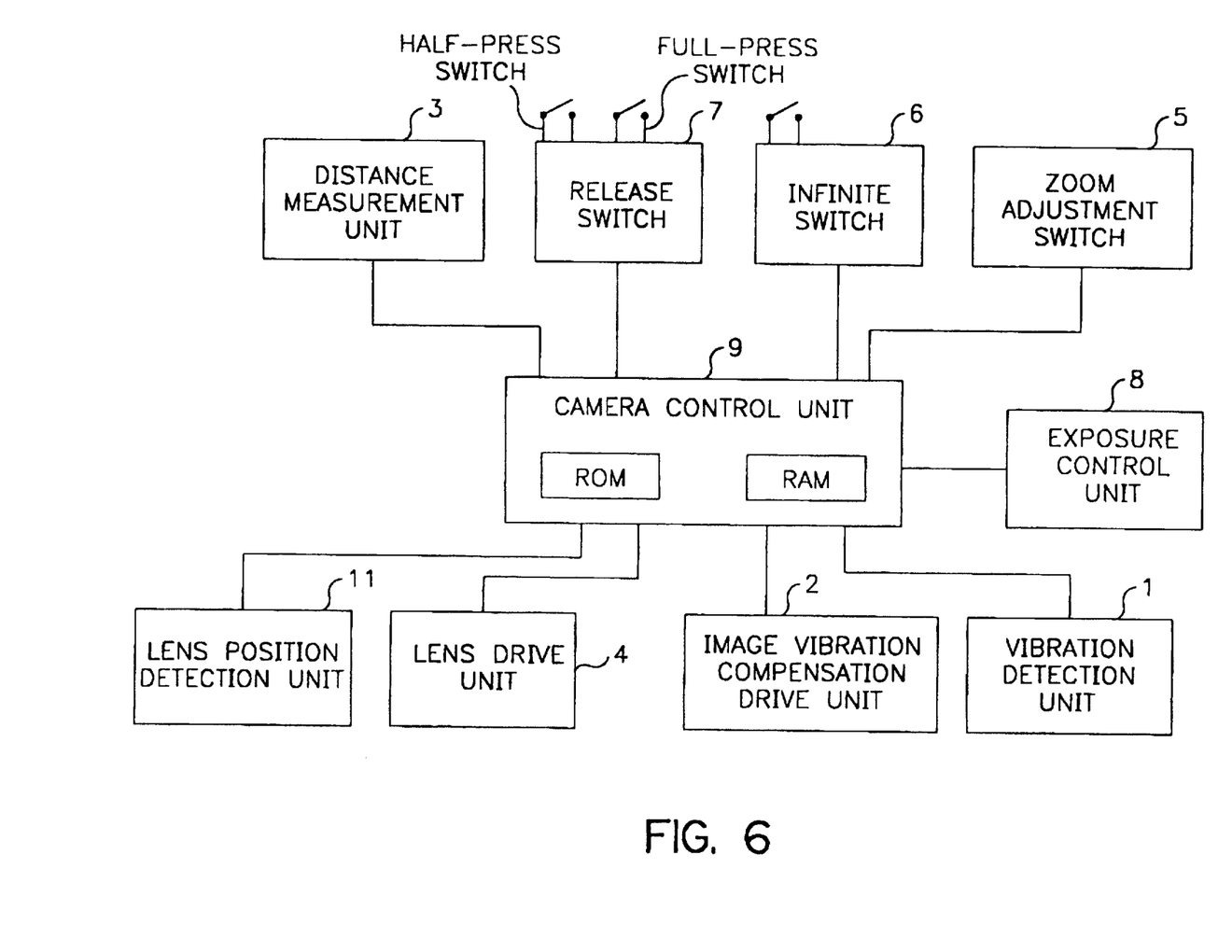
FIG. 6 is a block diagram of the embodiment depicted in FIG. 5.

Referring now to FIGS. 5 and 6, therein depicted is a second embodiment of the present invention. Moreover, the structures which are shown in FIGS. 5 and 6 and which are the same as those shown in FIGS. 1 and 2 operate in like manners. In this embodiment, a lens position detection unit 11 has been added to detect the position of photographic optical system 10.

Lens position detection unit 11 detects the position of photographic system 10's optical axis which is driven by lens drive unit 4. Output is based on the detected value.

Figure 7:
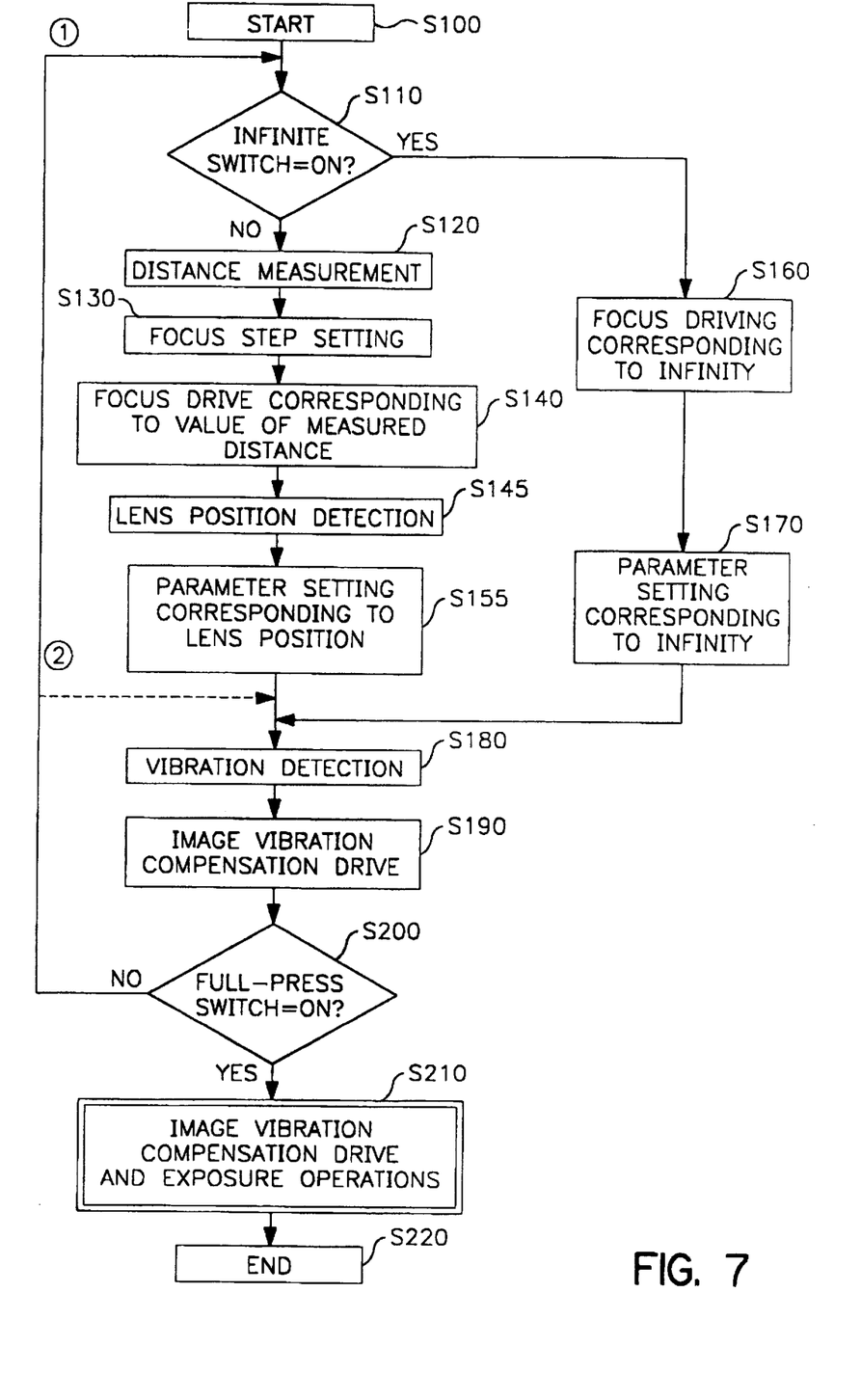
FIG. 7 is a flow chart that illustrates the operation of the embodiment depicted in FIG. 5.

Referring now to FIG. 7, therein depicted is a flow chart that illustrates the operation of the second embodiment depicted in FIGS. 5 and 6.

In FIG. 7, steps similar to those In FIG. 3 have been assigned the same numbers and explanation of the same is omitted. Also, the following discussion of the operations depicted in FIG. 7 are presented serially by referencing each step in the flow chart. The term "step" is abbreviated as "S."

S145: The position of photographic optical system 10, which was adjusted in S140, is detected by lens position detection unit 11. A signal corresponding to the detected value is output to camera control unit 9.)

S155. The above signal is input to camera control unit 9. Parameters corresponding to the position of photographic optical system 10 are set for the drive of the Image vibration compensation drive unit. These parameters are based upon the position (focus step position) of photographic optical system 10. Corresponding parameters have already been stored in the memory of camera control unit 9.

The aforementioned parameters are used in the same manner as explained in regard to S150 of FIG. 3. Also, the flow of solid line ① and dotted line ② is the same as In FIG. 3.

In contrast to the first embodiment implementation, lens position detection unit 11 has been added to the second embodiment. Camera control unit 9 for lens drive unit 4 is configured to monitor the driving amount while controlling the drive unit 4. For example, using driver equipment such as voice coils, DC motors, etc., the driving amount is detected through the use of an encoder. This does not cause a direct increase in the cost of the second embodiment.

Not requiring lens position detection in S160 through S170 has the following advantages. As explained above, in the "infinite photographic mode", when the set position of photographic optical system 10's optical axis is not included in the focusing step set-up (based on distance measurement results), the range of the lens position detection unit 11 is limited to the same range as the above set focusing step. Position settings for the "infinite photographic mode" are not included.

Also, since the position detection range can be made small, it is possible to minimize the cost and size of lens position detection unit 11.

Figure 8:
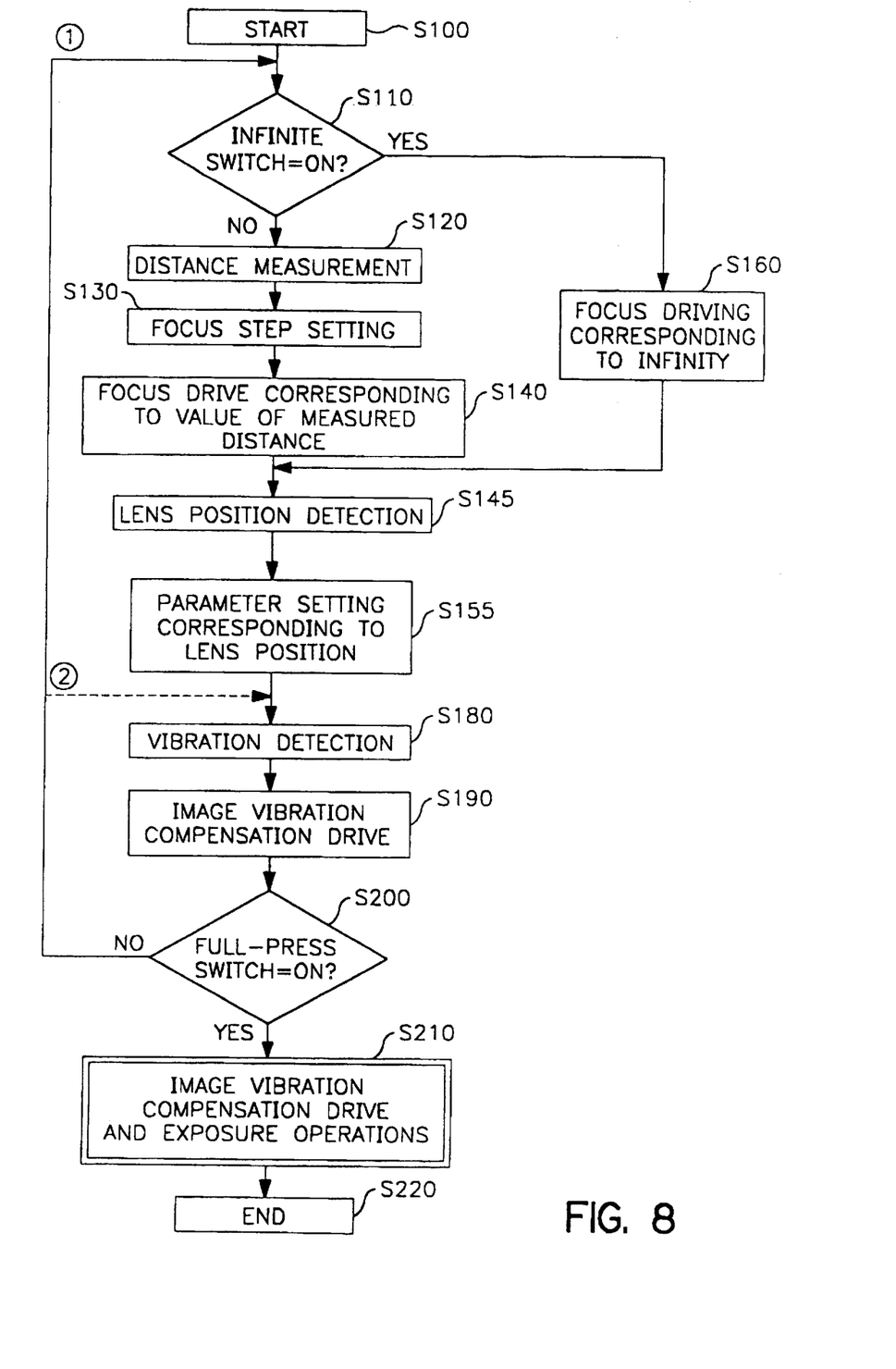
FIG. 8 is a flow chart that illustrates the operations of a third embodiment of the present invention.

Referring now to FIG. 8, therein depicted is a flow chart that illustrates the operations of a third embodiment of the present invention. In this figure, steps similar to those in FIGS. 3 and 7 have been assigned the same numbers.

In this third embodiment, step S170 is omitted. Following S160, processing advances to S145. The advantages of S170 in the second embodiment have been lost. However, even in the third embodiment, if due to cost or size limitations there were no lens position detection unit 11, the third embodiment could be utilized.

Even under those circumstances that a special set-up position can be specified for photographic optical system 10 in the "infinite photographic mode" of S160, since parameters corresponding to that position are stored in the memory of camera control unit 9, parameters for the image vibration compensation drive unit (corresponding to the position of photographic optical system 10) should be set.

The present invention is not limited to the three embodiments described above and shown in FIGS. 1–8, For example, in addition to the "infinite photographic mode", other modes may be specified for the set-up position of optical system 10. These modes include, "Close-up photography mode", and "portrait mode". It is also possible to set the state of photographic optical system 10 to a previously defined state. In setting these modes, there is no problem if the set-up position of optical system 10 is within the range of the focus driving (based on distance measurement).

In the above explanation for a lens shutter camera, distance measurement unit 3 was configured to use an external light source; however a TTL focus detection system also may be used. The above steps S120 through S140 should be performed contemporaneously with focus detection, focus drive quantity setting, and focus drive operations. In that case, by utilizing lens position detection unit 11 of the second embodiment, application is simple.

Since the rangefinder for a lens shutter camera generally uses external light, there is not much of a necessity for image vibration compensation drive during the half-press switch time interval. Therefore, if image vibration compensation drive during this half-press switch time interval is omitted, S190 may also be omitted. In this case, because of the operational characteristics of vibration detection unit 1, S180 should not be omitted. However, if the operation characteristics at start-up have been improved, S180 may be omitted (it is not necessary for operation to begin at the same time as the half-press switch). After S210, energy will be conserved by performing operations equivalent to S180 through S190. However, while the distance measurement unit has been described with respect to a rangefinder, other devices may be used such as a sonar unit.

In the above embodiments of the present invention, when mode settings for picture taking such as "infinite photographic mode" are selected by the photographic optical system, because specific coefficients already stored in memory can be output, necessary coefficients for drive control of the image vibration compensation unit can be readily determined.

The lens position detection unit 11 for detecting movement positions of the photographic optical system may be omitted. Even when the moving position of the photographic optical system will be detected, the moving position of the photographic optical system may be set which differs from the range of the distance measurement based focus driver. Coefficients necessary for driver control of the image vibration compensation unit may be obtained.

Although a few preferred embodiments of the present invention have been shown and described, it will be readily appreciated by those skilled in the art that many changes and modifications may be made to such preferred embodiments without departing from the principles and spirit of the present invention, the scope of which is defined in the appended claims and their equivalents.

What is claimed is:

1. A blur-correcting image pickup device comprising:
an image pickup optical system for picking up an image;
a vibration-detecting device which detects vibrations of the image pickup device and generates an output relative to the detected vibrations;
a blur-correcting device which corrects blurring of the image caused by said vibrations;
a distance measurement unit which detects distance of the image to be picked up and generates an output relative to the detected image pickup distance;
an optical system setup device which sets up a specific image pickup condition for said image pickup optical system unrelated to the output from the distance measurement unit;
an arithmetic information generating device which generates a first arithmetic factor when said specific image pickup condition is set up and a second arithmetic factor corresponding to the output of said distance measurement unit when said specific image pickup condition is not set up by said optical system setup device; and
a drive control device which calculates corrective information based on the output of the vibration-detecting device and the output of the arithmetic information generating device to control the blur-correcting device based on said corrective information.

2. The blur-correcting image pickup device of claim 1 wherein said specific image pickup condition of said optical system setup device is an infinite distance image pickup state.

3. The blur-correcting image pickup device of claim 1, wherein said specific image pickup condition of said optical system setup device is a close-up photography state.

4. A blur-correcting image pickup device comprising:
an image pickup optical system for picking up an image;
a vibration-detecting device detecting vibrations of the image pickup device and generating an output relative to the detected vibrations;
a blur-correcting device which corrects blurring of the image caused by the vibrations;
a condition-detecting device which detects an image pickup condition of said image pickup optical system;
an optical system setup device which sets up a specific image pickup condition for said image pickup optical system unrelated to an output from a distance measurement unit;
an arithmetic information generating device which generates a predetermined arithmetic factor when said specific image pickup condition is set up by said optical system setup device and an arithmetic factor corresponding to the condition of the image pickup optical system detected by the condition-detecting device when said specific image pickup condition is not set up by said optical system setup device; and
a drive control device which calculates corrective information based on the output of the vibration-detecting device and the output of the arithmetic information generating device to control the blur-correcting device based on said corrective information.

5. The blur-correcting image pickup device of claim 4, wherein said specific image pickup condition of said optical system setup device is an infinite distance image pickup state.

6. The blur-correcting image pickup device of claim 4, wherein said specific image pickup condition of said optical system setup device is a close-up photography state.

7. A blur-correcting image pickup device comprising:
an image pickup optical system for picking up an image;
a vibration-detecting device detecting vibrations of the image pickup device and generating an output relative to the detected vibrations;
a blur-correcting device which corrects blurring of the image caused by said vibrations;
a distance measurement unit detecting distance of the image to be picked up and generating an output relative to the detected image pickup distance;
a focusing device setting up an image pickup condition for said image pickup optical system corresponding to said image pickup distance;
an optical system setup device setting up an image pickup condition for said image pickup optical system different from the image pickup condition set up by said focusing device unrelated to the output from the distance measurement unit;
a condition-detecting device detecting the image pickup condition for said image pickup optical system;
an arithmetic information generating device generating an arithmetic factor corresponding to the image pickup condition detected by said condition-detecting device; and
a drive control device calculating corrective information based on the output of the vibration-detecting device and the output of the arithmetic information generating device.

8. The blur-correcting image pickup device of claim 7, wherein said specific image pickup condition of said optical system setup device is an infinite distance image pickup state.

9. The blur-correcting image pickup device of claim 7, wherein said specific image pickup condition of said optical system setup device is a close-up photography state.

10. A blur-correcting image pickup device comprising:
an image pickup optical system for picking up an image;
a vibration-detecting device detecting vibrations of the image pickup device and generating an output relative to the detected vibrations;
a blur-correcting device correcting blurring of the image caused by said vibrations;
a distance measurement unit detecting distance of the image to be picked up and generating output relative to the detected image pickup distance;
a focusing device setting up an image pickup condition for said image pickup optical system corresponding to said image pickup distance;
an optical system setup device setting up a specific image pickup condition different from the image pickup condition for the image pickup optical system set up by said focusing device unrelated to the output from the distance measurement unit;
an arithmetic information generating device generating a predetermined arithmetic factor when said specific image pickup condition is set up by said optical system setup device and an arithmetic factor corresponding to the output of said distance measurement unit when said specific image pickup condition is not set up; and
a drive control device calculating corrective information based on the output of the vibration-detecting device as well as the output of the arithmetic information generating device to control the blur-correcting device based on said corrective information.

11. The blur-correcting image pickup device of claim 10, wherein said specific image pickup condition of said optical system setup device is an infinite distance image pickup state.

12. The blur-correcting image pickup device of claim 10, wherein said specific image pickup condition of said optical system setup device is a close-up photography state.

13. A blur-correcting image pickup device comprising:

an image pickup optical system for picking up an image;

a vibration-detecting device detecting vibrations of the image pickup device and generating an output relative to the detected vibrations;

a blur-correcting device correcting blurring of the image caused by said vibrations;

a distance measurement unit detecting distance of the image of to be picked up and generating an output relative to the detected image pickup distance;

a focusing device to set up an image pickup condition for said image pickup optical system corresponding to said image pickup distance;

a condition-detecting device detecting an image pickup condition for said image pickup optical system;

an optical system setup device setting up a specific image pickup condition different from the image pickup condition set up by said focusing device unrelated to the output from the distance measurement unit;

an arithmetic information generating device generating a predetermined arithmetic factor when said specific image pickup condition is set up by said optical system setup device and a arithmetic factor corresponding to the condition of the image pickup optical system detected by the condition-detecting device when said specific image pickup condition is not set up; and a drive control device calculating corrective information based on the output of the vibration-detecting device and the output of the arithmetic information generating device to control the blur-correcting device based on said corrective information.

14. The blur-correcting image pickup device of claim 13, wherein said specific image pickup condition of said optical system setup device is an infinite distance image pickup state.

15. The blur-correcting image pickup device of claim 13, wherein said specific image pickup condition of said optical system setup device is a close-up photography state.

16. A camera comprising:

an optical system to produce an image of a subject;

a vibration detection device detecting vibrations of the camera and generating vibration information;

a blur correction device correcting blurring of the image caused by the vibrations;

a distance measurement unit detecting subject distance and generating distance information;

an optical system setting device setting an optical condition for the optical system irrespective of the distance information generated by the distance measurement unit;

a parameter setting device generating a first parameter when the optical condition is set by said optical system setting device and a second parameter corresponding to the output of the rangefinder when the optical condition is not set by the optical system setting device; and a drive control device calculating corrective information based on the output of the vibration-detecting device and the output of the parameter setting device to control the blur-correcting device based on the corrective information.

17. The camera of claim 16, wherein the optical condition set by the optical system setting device is an infinite distance imaging state.

18. The camera of claim 16, wherein the optical condition set by the optical system setting device is a close-up imaging state.

* * * * *